Oct. 20, 1931.    J. BRYAN    1,828,486
ANIMAL TRAP
Filed Aug. 12, 1930    2 Sheets-Sheet 2
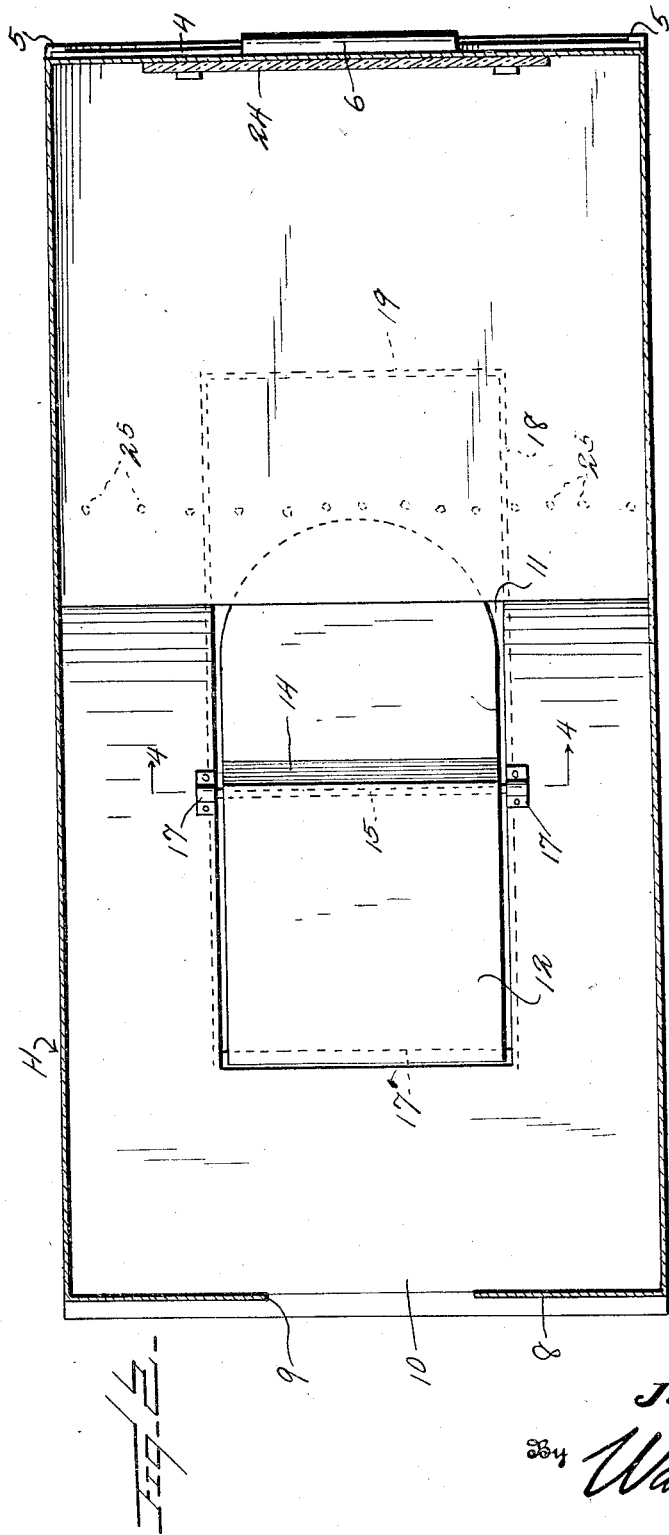
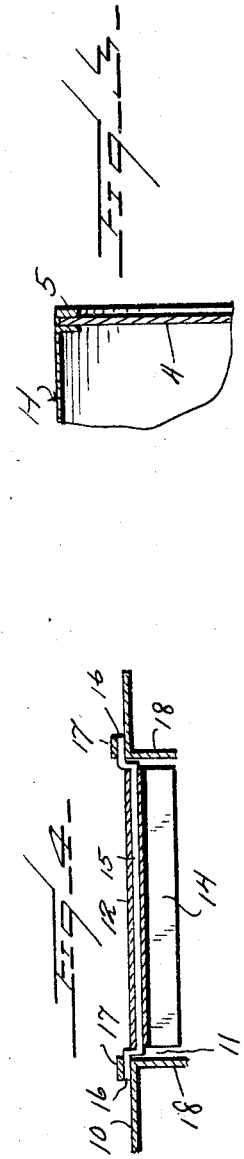
Inventor
J. Bryan
By Watson E. Coleman
Attorney Patented Oct. 20, 1931

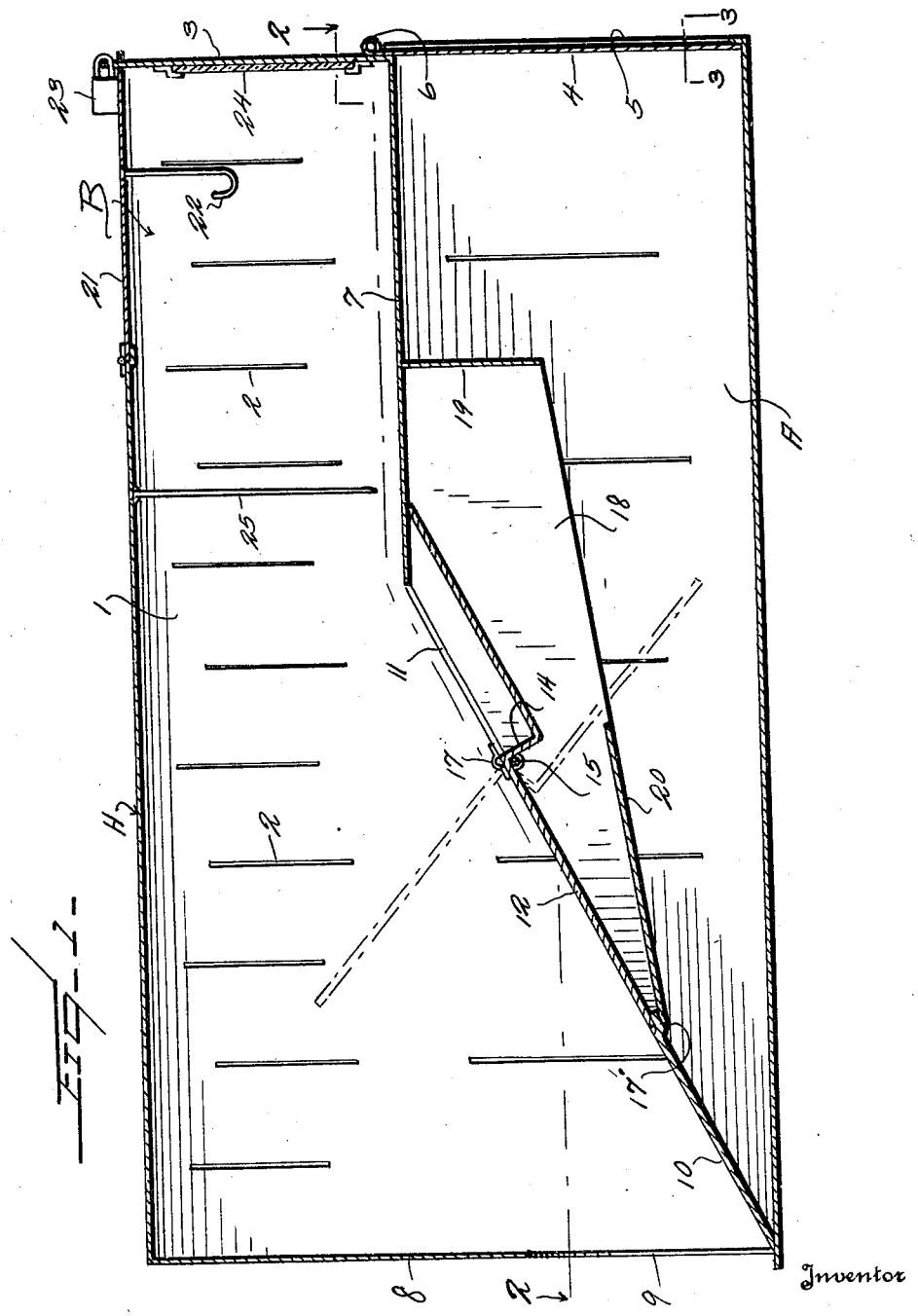

1,828,486

UNITED STATES PATENT OFFICE

JULIAN BRYAN, OF LAFLEUR, WASHINGTON

ANIMAL TRAP

Application filed August 12, 1930. Serial No. 474,809.

This invention relates to animal traps and has relation more particularly to a device of this kind of a self-set and everset type, and it is an object of the invention to provide a device of this character which operates effectually to trap an animal without injury or torture to the captive.

Another object of the invention is to provide a device of this kind comprising a tilting platform normally maintained in effective position and which is constructed in a manner to cause the animal to step or jump down to facilitate capture.

The invention consists in the details of construction and in the combination and arrangement of the several parts of my improved animal trap whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a vertical sectional view taken through a trap constructed in accordance with an embodiment of my invention, a second position of the platform being indicated by broken lines;

Figure 2 is a horizontal sectional view taken substantially on the line 2—2 of Figure 1;

Figure 3 is an enlarged fragmentary sectional view taken substantially on the line 3—3 of Figure 1;

Figure 4 is a detailed sectional view taken substantially on the line 4—4 of Figure 2.

As disclosed in the accompanying drawings, H denotes a housing of desired dimensions, the walls of which being preferably made from sheet metal. Each of the side walls 1 of the housing is provided with suitably positioned narrow slots 2 providing means for effective air circulation. The lower portion of the rear wall 3 of the housing is cut out to provide an opening to permit ready access within the trap when desired and also to provide a means for the delivery of the captive. This open portion is normally closed by a vertically sliding door 4 mounted within suitable guideways 5 at the opposite sides of the opening. The top portion of the door 4 is provided with a barrel 6 or the like whereby the door may be conveniently lifted or moved into open position. The end portion of the housing H immediately adjacent to the end wall 3 provided with the opening just referred to is intersected by a horizontally disposed partition 7, said partition being herein shown as arranged substantially coplanar with the upper edge of the opening in the end wall 3. This partition 7 extends a desired distance inwardly of the housing H and terminates a material distance from the second or opposite end wall 8.

The end wall 8 in its lower part and at substantially its transverse center is provided with an entrance opening 9 of desired dimensions and from which leads an upwardly and rearwardly inclined runway 10 leading to the partition 7. The upper portion of the runway 10 at its transverse center is provided with a relatively large cut out portion or area 11 which is normally closed by a platform 12. This platform 12 has its upper portion downwardly offset, as at 14 with respect to its forward portion and said platform 12 forwardly of but immediately adjacent to the offset portion 14 is mounted for swinging movement upon a hanger rod 15. This rod 15 is substantially U-shaped in form and has its side members continued with the outwardly and laterally directed trunnions 16 whereby the hanger rod may be operatively engaged by the bearings 17, thus maintaining the platform 12 in desired position with respect to the cut out portion 11 of the runway 10.

The forward portion of the platform 12 is of greater weight than that of the upper portion, thus assuring the platform being normally maintained in closed position with respect to the cut out portion 11. The downward swinging movement of the forward portion of the platform 12 is limited by contact of the forward extremity of the platform 12 within the rabbet 17' provided in the portion of the runway 10 defining the lower end of the cut out portion 11. This movement of the platform 12 is also limited by contact of the upper portion of the platform with the under surface of the partition 7.

Depending from the runway 10 at opposite sides of the cut out portion 11 are the walls 18 between which the upper portion of the platform 12 works.

These walls 18 extend a slight distance inwardly of the partition 7 and have their extremities below said partition connected by a cross wall 19. The lower marginal portions of the walls 18 below the lower portion of the platform 12 are connected by the plate or wall 20. These walls 18, 19 and 20 provide effective means to prevent an animal within the capture chamber $a$ from having such access to the platform 12 whereby an escape may be effected.

The portion of the housing H above the partition 7 constitutes a bait chamber B and access may be had within said chamber B by swinging the door 21, comprised in the top of the housing, into open position. This door 21, as herein disclosed, carries a bait hook 22. The door 21 may be effectively held closed in any desired manner as by a conventional hasp lock 23 engaged with the end wall 3 at a desired point above the closed door 21.

The end wall 3 has placed over its inner face a mirror 24 to provide further means for attracting an animal.

The bait chamber B is separated from the forward portion of the housing H by a series of depending pins 25 or the like carried by the top wall of the housing H.

As an animal enters the housing H through the entrance opening 9 he will pass upwardly of the runway 10, being attracted by the bait upon the hook 22 or by the reflection in the mirror 24 or both. As the animal travels upwardly of the runway 10 he will pass upon the lower portion of the platform 12 and in order to pass upon the upper portion of the platform the animal will have to step down or jump down as is the natural tendency of animals. This stepping or jumping down of the animal upon the upper portion of the platform assures such upper portion of the platform immediately swinging downwardly throwing the animal in the capture chamber $a$ where the animal may be effectively held until the door 4 is opened.

From the foregoing description it is thought to be obvious that an animal trap constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A trap of the class described comprising in combination a housing having an entrance opening in a wall thereof, a runway within the housing extending upwardly from the entrance opening, said runway having a portion cut out, a platform coacting with said cut out portion of the runway, means for pivotally mounting the platform for swinging movement, one end portion of the platform being downwardly offset with respect to the other, and one end portion of the platform being heavier than the opposite end portion to normally maintain the platform in closed position with respect to the cut out portion of the runway, a horizontal partition intersecting an end portion of the housing and to which the runway leads, a portion of the housing above the partition constituting a bait chamber, and depending members carried by the top wall of the housing separating the bait chamber from the remaining portion of the housing.

In testimony whereof I hereunto affix my signature.

JULIAN BRYAN.